US012665890B2

(12) United States Patent
Tomlin et al.

(10) Patent No.: US 12,665,890 B2
(45) Date of Patent: Jun. 23, 2026

(54) SECURE PLATFORM FOR TEST AND INFRASTRUCTURE MANAGEMENT

(71) Applicant: Microsoft Technology Licensing, LLC, Redmond, WA (US)

(72) Inventors: Alexander Stephen Tomlin, Kirkland, WA (US); Joshua Daniel Baugher, Warrenton, VA (US); Alexander Stephen Thielman, Seattle, WA (US); Matthew Dean Sievers, Redmond, WA (US); Larry Darnell Wilcher, II, Dacula, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 296 days.

(21) Appl. No.: 18/458,468

(22) Filed: Aug. 30, 2023

(65) Prior Publication Data

US 2025/0080514 A1     Mar. 6, 2025

(51) Int. Cl.
*H04L 9/40*       (2022.01)
*G06F 9/455*     (2018.01)

(52) U.S. Cl.
CPC ........ *H04L 63/068* (2013.01); *G06F 9/45558* (2013.01); *H04L 63/108* (2013.01); *G06F 2009/45587* (2013.01); *G06F 2009/45591* (2013.01)

(58) Field of Classification Search
CPC ..... H04L 63/068; H04L 9/088; H04L 63/108; G06F 2009/45591; G06F 2009/45587; G06F 9/45558
See application file for complete search history.

(56) References Cited

U.S. PATENT DOCUMENTS

| | | | |
|---|---|---|---|
| 9,256,452 B1 * | 2/2016 | Suryanarayanan | .......................... G06F 9/45558 |
| 10,635,476 B2 | 4/2020 | Blum et al. | |
| 10,691,514 B2 | 6/2020 | Mcclory et al. | |
| 10,841,088 B2 * | 11/2020 | Fan | ...................... H04L 67/146 |
| 11,947,678 B2 * | 4/2024 | Dunjic | ................ G06F 11/3688 |
| 2013/0019242 A1 | 1/2013 | Chen et al. | |
| 2019/0245745 A1 * | 8/2019 | Macatangay | ....... H04L 41/0866 |
| 2021/0055917 A1 | 2/2021 | Khakare et al. | |
| 2022/0385663 A1 | 12/2022 | Baryshnikov et al. | |
| 2023/0155830 A1 | 5/2023 | Sethuraman et al. | |

(Continued)

OTHER PUBLICATIONS

"Automated Testing in Virtual Machines", Retrieved From: https://smartbear.com/learn/automated-testing/testing-on-virtual-machines/, Jul. 4, 2023, 8 Pages.

*Primary Examiner* — Frantz B Jean

(74) *Attorney, Agent, or Firm* — Ray Quinney & Nebeker P.C.; Paul N. Taylor

(57) ABSTRACT

A virtual machine (VM) test instance is created in a virtual machine scale set. When the VM test instance is created, a unique set of credentials is also created corresponding to the VM test instance. The unique set of credentials is stored in a secret store that is separate from other cloud and organization credentials. When access to a VM test instance is requested by a user, the unique credentials are provided to the user to use the VM test instance for a limited time. When the user is finished using the VM test instance, or when the VM test instance expires, then the VM test instance is destroyed and the unique credentials are also destroyed.

20 Claims, 7 Drawing Sheets

(56)        References Cited

U.S. PATENT DOCUMENTS

| | | | |
|---|---|---|---|
| 2023/0237146 A1* | 7/2023 | Balakrishnan | H04L 9/321 |
| | | | 726/6 |
| 2023/0297495 A1* | 9/2023 | Kumar | G06F 11/1417 |
| | | | 714/38.1 |
| 2023/0409715 A1* | 12/2023 | Nissim | G06F 9/45533 |
| 2024/0236112 A1* | 7/2024 | Singwi | H04L 63/108 |

* cited by examiner

Figure 1:
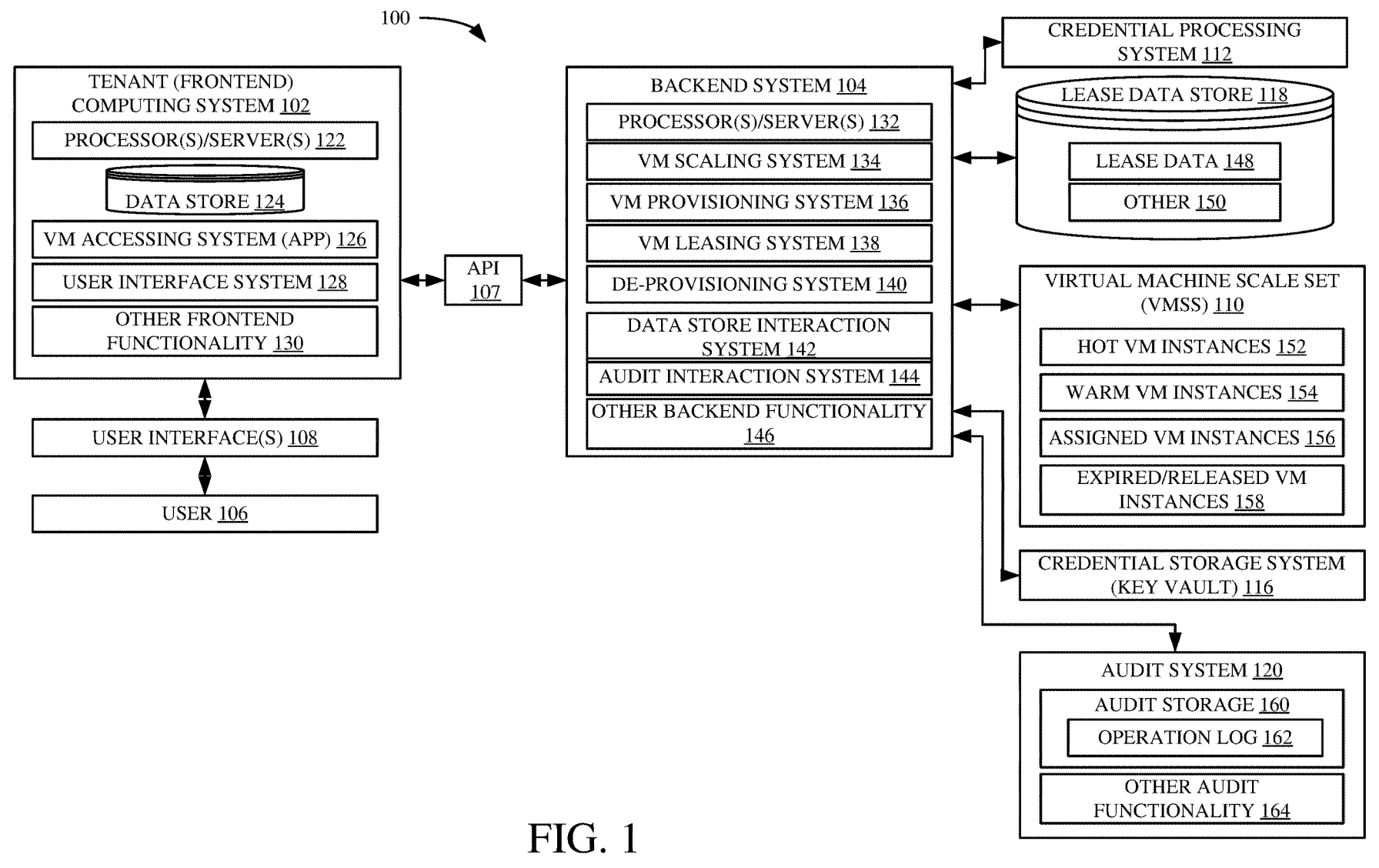

CREDENTIAL PROCESSING SYSTEM 112

LEASE DATA STORE 118

LEASE DATA 148

OTHER 150

VIRTUAL MACHINE SCALE SET (VMSS) 110

HOT VM INSTANCES 152

WARM VM INSTANCES 154

ASSIGNED VM INSTANCES 156

EXPIRED/RELEASED VM INSTANCES 158

CREDENTIAL STORAGE SYSTEM (KEY VAULT) 116

AUDIT SYSTEM 120

AUDIT STORAGE 160

OPERATION LOG 162

OTHER AUDIT FUNCTIONALITY 164

BACKEND SYSTEM 104

PROCESSOR(S)/SERVER(S) 132

VM SCALING SYSTEM 134

VM PROVISIONING SYSTEM 136

VM LEASING SYSTEM 138

DE-PROVISIONING SYSTEM 140

DATA STORE INTERACTION SYSTEM 142

AUDIT INTERACTION SYSTEM 144

OTHER BACKEND FUNCTIONALITY 146

API 107

TENANT (FRONTEND) COMPUTING SYSTEM 102

PROCESSOR(S)/SERVER(S) 122

DATA STORE 124

VM ACCESSING SYSTEM (APP) 126

USER INTERFACE SYSTEM 128

OTHER FRONTEND FUNCTIONALITY 130

USER INTERFACE(S) 108

USER 106

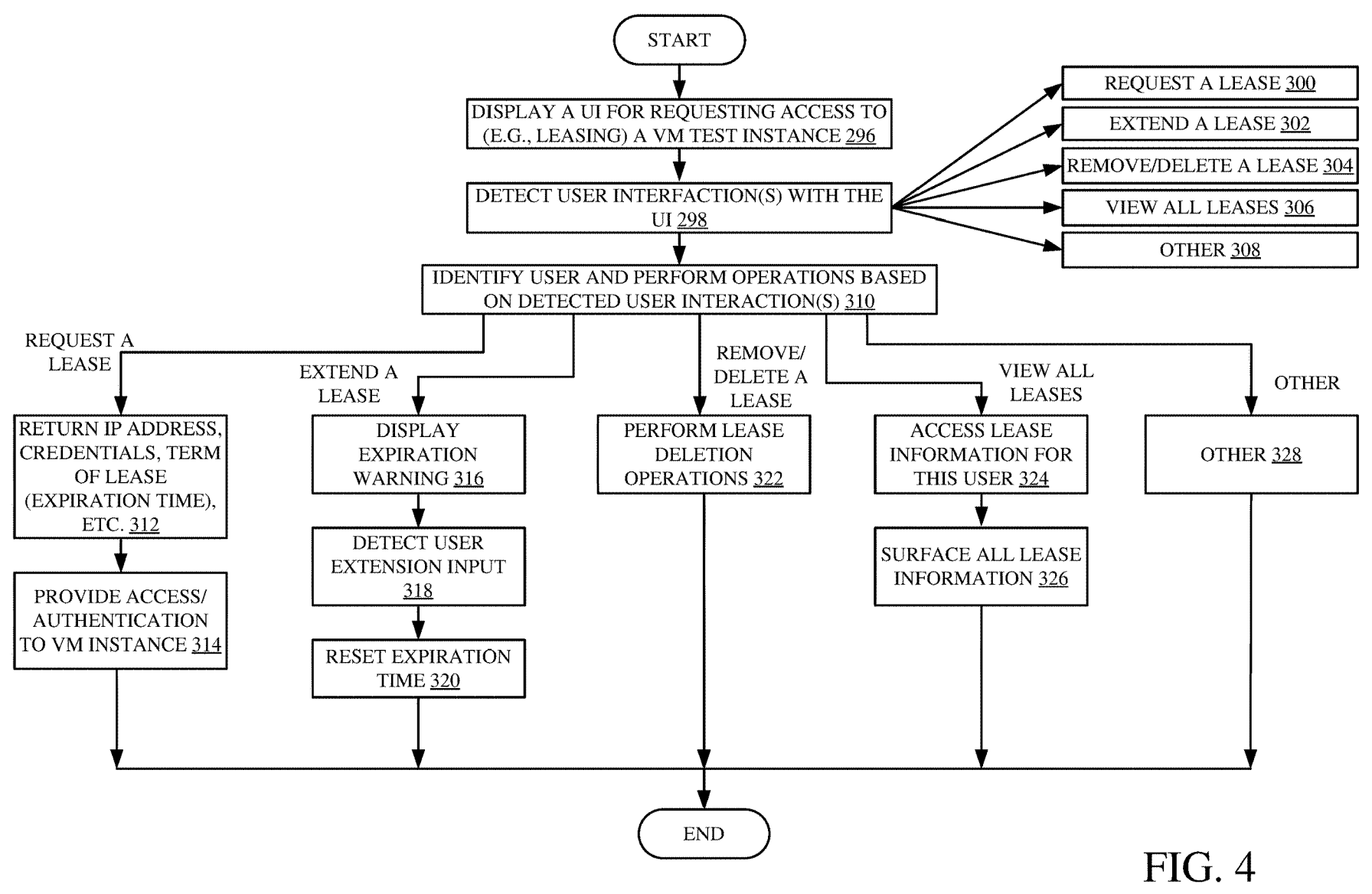

REQUEST A LEASE 300

EXTEND A LEASE 302

REMOVE/DELETE A LEASE 304

VIEW ALL LEASES 306

OTHER 308

START

DISPLAY A UI FOR REQUESTING ACCESS TO (E.G., LEASING) A VM TEST INSTANCE 296

DETECT USER INTERFACTION(S) WITH THE UI 298

IDENTIFY USER AND PERFORM OPERATIONS BASED ON DETECTED USER INTERACTION(S) 310

OTHER

OTHER 328

VIEW ALL LEASES

ACCESS LEASE INFORMATION FOR THIS USER 324

SURFACE ALL LEASE INFORMATION 326

REMOVE/ DELETE A LEASE

PERFORM LEASE DELETION OPERATIONS 322

EXTEND A LEASE

DISPLAY EXPIRATION WARNING 316

DETECT USER EXTENSION INPUT 318

RESET EXPIRATION TIME 320

REQUEST A LEASE

RETURN IP ADDRESS, CREDENTIALS, TERM OF LEASE (EXPIRATION TIME), ETC. 312

PROVIDE ACCESS/ AUTHENTICATION TO VM INSTANCE 314

END

FIG. 4

SECURE PLATFORM FOR TEST AND INFRASTRUCTURE MANAGEMENT

BACKGROUND

Computing systems are currently in wide use. Some computing systems are hosted systems which are deployed in a remote server environment, such as in a cloud environment.

Some cloud environments do not allow developers to use their own machines to reproduce issues or test functionality, locally, during development and maintenance of the functionality in the cloud environment. In such environments, it is not uncommon for engineers or other developers who are working in the cloud environment, and need to test functionality, to create virtual machine instances in the cloud environment that is being developed. Those virtual machine instances are created to act as client machines that can be used to reproduce issues and/or to test functionality. These types of virtual machine (VM) instances can be referred to as VM test instances or test machines.

The discussion above is merely provided for general background information and is not intended to be used as an aid in determining the scope of the claimed subject matter.

SUMMARY

A virtual machine (VM) test instance is created in a virtual machine scale set. When the VM test instance is created, a unique set of credentials is also created corresponding to the VM test instance. The unique set of credentials is stored in a secret store that is separate from other cloud and organization credentials. When access to a VM test instance is requested by a user, the unique credentials are provided to the user to use the VM test instance for a limited time. When the user is finished using the VM test instance, or when the VM test instance expires, then the VM test instance is destroyed and the unique credentials are also destroyed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS architecture.

FIG. 1 is a block diagram showing one example of a computing system detail.

FIG. 4 is a flow diagram showing one example of the operation of a frontend system in more detail.

DETAILED DESCRIPTION

Figure 2:
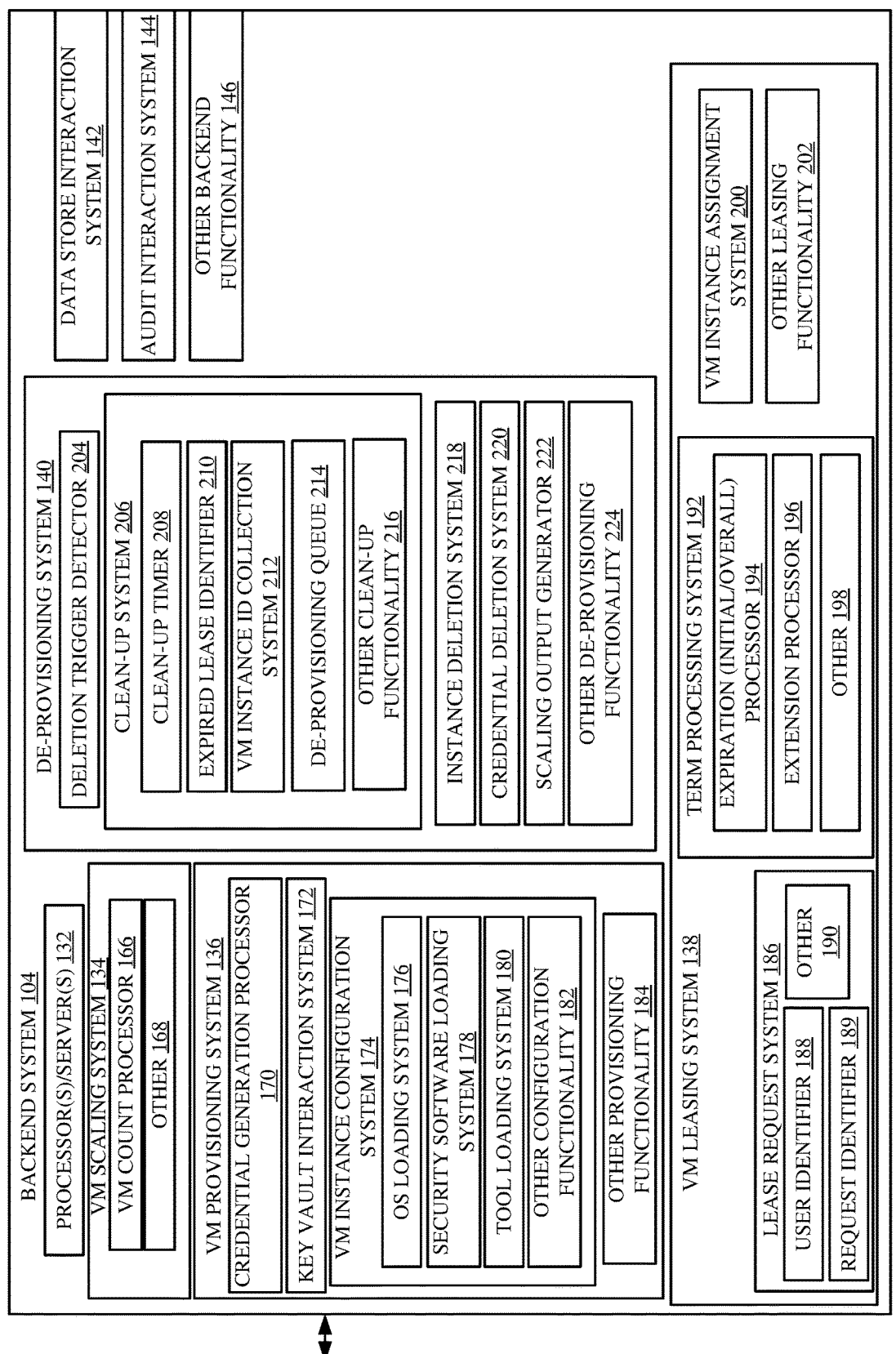
FIG. 2 is a block diagram showing one example of a backend system in more detail.

As discussed above, virtual machine (VM) instances which are built to reproduce issues or to test functionality in a cloud that is being developed and/or maintained are often created by engineers or other developers with the intent to perform testing. These types of VM test instances (or test machines) are often created and deployed to a user in the cloud computing environment first and then configured. During configuration a VM test instance is loaded with an operating system, cloud security software packages, and any desired tooling (or diagnostic software) that is used to reproduce issues or to test functionality. However, since these types of test machines will not form part of the cloud infrastructure that is being developed, the test machines are often created without significant security considerations and may therefore be open to exploitation by malicious actors. Similarly, because the test machines are loaded with diagnostic software for examining failing scenarios, and because that software is often very valuable to malicious actors within the system, the test machines may be a valuable target for security threats.

The present description thus describes a system in which virtual machine (VM) test instances are generated and deployed in a secure manner. The VM test instances, once created, have a set of unique credentials generated for them, and those credentials are stored in a key vault (or other secret store) that is separate from other cloud or corporate identifies. Storing the credentials separately from other identities limits the lateral movement of a malicious actor who may surreptitiously obtain the credentials. When a user requests access to a VM test instance, the credentials for a VM test instance are provided to the requesting user for a limited period of time. This ensures that a malicious actor who obtains access to the credentials has a limited amount of time within which to use them. When the time expires, the VM test instance is destroyed and the credentials corresponding to that VM test instance are also discarded. The number of VM test instances that are waiting to be assigned to requesting users may be monitored and the number of VM test instances can be scaled accordingly.

In accordance with one example, when a VM test instance is created, it is loaded with a most recent version of a desired operating system to ensure that the operating system-level security patches have already been applied. Similarly, once the VM test instance is provisioned, security software packages are loaded to increase the likelihood of intrusion detection. Further, the VM test instance can be loaded with tooling that may be used to perform tests, or to reproduce issues. Similarly, when the VM test instance and credentials are destroyed, any data that the VM test instance used is also removed and deleted within a desired time period which inhibits the accidental over-preservation of data.

FIG. 1 is a block diagram of one example of a computing system architecture 100 in which a tenant (frontend) computing system 102 has access to a backend system 104 by interacting with an application programming interface (API) 107 exposed by backend system 104. A user 106 can interact with user interfaces 108 generated by tenant (frontend) computing system 102 to control and manipulate tenant computing system 102 and portions of backend system 104. Backend system 104 provides the user 106 with access to different functionality, such as VM test instances in a virtual machine scale set 110. As the VM test instances in virtual machine scale set 110 are generated, credentials for each VM test instance are generated by credential processing system 112. The credentials for each VM test instance can be stored in credential storage system 116 (which may be a key vault or other secret store). When a user 106 is assigned one of the VM test instances, the terms under which the user is assigned to that VM test instance are referred to as a lease. The lease is stored in lease data store 118. Data that represents the actions taken by user 106 and backend system 104 with respect to each of the VM test instances can be stored and analyzed by an audit system 120.

More specifically, the tenant computing system 102 includes one or more processors or servers 122, data store 124, virtual machine accessing system (or application) 126, user interface system 128, and other frontend functionality 130. Backend system 104 includes one more processors or servers 132, virtual machine scaling system 134, virtual machine provisioning system 136, virtual machine leasing system 138, de-provisioning system 140, data store interaction system 142, audit interaction system 144, and other backend functionality 146. Lease data store 118 includes lease data 148 and other items 150. Virtual machine scale set 110 can include a set of hot VM test instances 152, warm VM test instances 154, assigned VM test instances 156, and expired/released VM test instances 158. Audit system 120 can include an audit store 160 that stores operation log data 162. Audit system 120 can include other audit functionality 164 as well. Before describing the operation of computing system architecture 100 in more detail, a description of some of the items in architecture 100, and their operation will first be provided.

Virtual machine accessing system 126 can be a front end application that runs on a tenant machine and uses user interface system 128 to expose a user interface 108 for interaction by user 106. User 106 can interact with the user interfaces 108 in order to request access to a virtual machine instance, for test purposes, in virtual machine scale set 110, or in order to release a virtual machine instance when user 107 is finished with it. Based upon the user inputs, VM accessing system 126 interacts with API 106 to communicate with backend system 104. VM scaling system 134 scales the number of virtual machine instances up or down to maintain a desired number of hot virtual machine test instances 152, and warm virtual machine test instances 154. The hot virtual machine test instances 152 are virtual machine instances that are created, have credentials generated for them, are configured with various software items loaded on to them, and are running. When a user 106 requests access to a virtual machine test instance, the user can be assigned to a hot virtual machine test instance 152, which is already running, so that latency in providing the user with access to a VM test instance is very low. The warm virtual machine test instances 154 are similar to hot virtual machine test instances 152 (in that they are created, credentials have been generated, and they are configured), except that the warm virtual machine test instances 154 are not running. Therefore, in order to assign them to a user, they must first be turned on, which is also a relatively low latency process but is longer than assigning an already running hot VM test instance 152.

Virtual machine provisioning system 136 can provision virtual machine instances based upon whether virtual machine scaling system 134 determines that additional virtual machine instances are to be provisioned. Virtual machine leasing system 138 can assign VM test instances to user(s) 106 so user(s) 106 have access to one or more virtual machine test instances. For example, when a user 106 requests access to a virtual machine test instance, then VM leasing system 138 can obtain the credentials for a VM test instance from credential storage system (key vault) 116 and provide those credentials to user 106 so that user 106 can access that particular VM test instance.

In one example, virtual machine leasing system 138 provides the credentials to user 106 for a limited period of time. That time period may be initially set to a period that is extendable, but may have an ultimate expiration time which is unextendible. When user 106 releases the VM test instance, or when the credentials for that VM test instance expire, then de-provisioning system 140 de-provisions the VM test instance. De-provisioning system 140 destroys the VM test instance from virtual machine scale set 110 and also destroys the credentials for that VM test instance from credential storage system (key vault) 116. The de-provisioning system 140 can also destroy or remove any data that was used by the VM test instance.

Data store interaction system 142 can store the lease information (which governs the access that a user 106 has to VM test instance) as lease data 148 in lease data store 118. In addition, user 106 may provide an input through user interface 108 to view all leases that user 106 currently has (e.g., the leases which define the VM test instances that are currently assigned to user 106). In that case, data store interaction system 142 accesses all lease data 148 corresponding to user 106 and returns that data through API 107 so that the lease data 148 can be output on a user interface 108 for user 106.

Audit interaction system 144 monitors all interactions corresponding to the VM test instances in virtual machine scale set 110 and provides that information to audit system 120 where the information can be stored as operation log data 162 in audit store 160. A wide variety of data may be stored, including data indicative of the creation of a VM test instance, the assignment of the VM test instance, information defining the user 106 to whom the VM test instance was assigned, timing data indicative of when the VM test instance was assigned, its expiration time, whether the expiration time was extended, and when the expiration time expired, as well as when the VM test instance was deleted. All of this information (and other information) may be maintained in audit store 160, even after a VM test instance is deleted, so that the record can be audited at a later time.

FIG. 2 is a block diagram of one example of backend system 104, showing some items in more detail than they are shown in FIG. 1. FIG. 2 shows that VM scaling system 134 includes VM count processor 166 and other items 168. VM provisioning system 136 includes credential generation processor 170, key vault interaction system 172, VM instance configuration system 174 (which, itself, can include operating system (OS) loading system 176, security software loading system 178, tool loading system 180, and other configuration functionality 182), and other provisioning functionality 184. VM leasing system 138 includes lease request system 186 (which, itself, includes user identifier 188 and other items 190), term processing system 192 (which, itself, includes expiration processor 184, extension processor 186, and other items 198), VM instance assignment system 200, and other leasing functionality 202. De-provisioning system 140 includes deletion trigger detector 204, clean-up system 206 (which, itself, can include clean-up timer 208, expired lease identifier 210, VM instance ID collection system 212, de-provisioning queue 214, and other clean-up functionality 216), instance deletion system 218, credential deletion system 220, scaling output generator 222, and other de-provisioning functionality 224. Before describing the operation of backend system 104 in more detail, a description of some of the items in backend system 104 and their operation, will first be provided.

VM count processor 166 counts the number of VM test instances in virtual machine scale set 110 to determine whether any additional VM test instances should be provisioned or whether any should be de-provisioned or destroyed. In one example, VM count processor 166 compares the number of hot VM test instances 152 to a first threshold number, and compares the number of warm VM test instances 154 to a second threshold. The result of the comparison can be output to VM provisioning system 136 and/or to de-provisioning system 140. If additional VM test instances need to be provisioned (e.g., the current number of VM test instances is below the threshold), then VM provisioning system 136 provisions them. Where VM test instances need to be de-provisioned, then de-provisioning system 140 de-provisions them.

In order to provision a VM test instance, credential generation processor 170 can interact with credential processing system 112 to generate a set of unique credentials for the newly provisioned VM test instance. The credentials can include a user name, password, IP address, etc. that can be used by a user to access the newly provisioned VM test instance. Key vault interaction system 172 interacts with credential storage system (key vault) 116 to store the credentials corresponding to the newly provisioned VM test instance in credential storage system (key vault) 116. System 116 can include functionality for encrypting the credentials in the storage system 116 and when sent to a requesting tenant or client. System 116 can also incorporate authentication functionality so a requesting user must authenticate to the system 116 before gaining access to the credentials.

VM instance configuration system 174 then configures the newly provisioned VM test instance for secure development and to perform testing, to recreate issues, etc., with respect to the cloud system that is being generated and that needs to be tested. OS loading system 176 loads the VM instance with a most recent version of a desired operating system. This ensures that all current security patches have already been applied. Security software loading system 178 loads the VM instance with security software that can be used to detect surreptitious activity or malicious intrusions or other security incidents. Tool loading system 180 loads the VM instance with tools that can be used to reproduce issues, to test functionality, etc.

In VM leasing system 138, lease request system 186 receives and processes requests from user 106. For instance, user identifier 188 identifies the user making the request and request identifier 189 identifies the specific requests being made. For instance, the request may be to obtain an assignment of a VM test instance for test purposes. The request may be to delete or release a VM test instance once user 106 is finished using the VM test instance. The request may be other requests as well. Term processing system 192 assigns an initial expiration time to the VM test instance that is assigned to user 106. Expiration processor 194 identifies an initial expiration period and an overall expiration period. For example, the initial expiration period may be 2 hours but may be extendable up to 12 hours (e.g., in 2 hour increments). The overall expiration period of 12 hours may be unextendible. Therefore, when user 106 requests access to a VM test instance, expiration processor 194 may set both the initial expiration period and the overall expiration period. Extension processor 196 may detect user requests to extend the expiration period and, when the expiration period is extendable, identify a new, extended expiration period in response to the user request.

VM instance assignment system 200 identifies a VM test instance to be assigned to the user 106 in response to the user request. VM instance assignment system 200 obtains the credentials for the VM test instance to be assigned from credential storage system or key vault 116. The credentials may include a username, password, string (IP address), or other information that user 106 can use to access the VM test instance. VM instance assignment system 200 returns that information (the credentials, along with the expiration periods and the VM instance identifier which identifies the VM test instance) to the requesting user 106. User 106 can then use that information to access the VM test instance to which the user was assigned. VM instance assignment system 200 also uses data store interaction system 142 to store the information indicative of the leased (or assigned) VM test instance as lease data 148 in lease data store 118 (shown in FIG. 1). For instance, VM assignment system 200 can use data store interaction system 142 to store the user identity, the VM test instance identifier that identifies the VM test instance that the user was assigned to, the expiration periods, the time when the user was given access to the VM test instance, the credentials for the VM test instance, the type of VM instance (assuming there is more than one type that the user can access), among a wide variety of other information.

In de-provisioning system 140, deletion trigger detector 204 detects a deletion trigger indicating that a VM test instance should be deleted or de-provisioned. For instance, where user 106 interacts with a user interface 108 to release or delete a VM test instance that user 106 was using, this may be detected by deletion trigger detector 204 as a trigger to delete the identified VM test instance. Deletion trigger detector 204 can detect other triggers as well.

Clean-up system 206 runs a clean-up operation intermittently to de-provision VM test instances that have been marked as deleted (based on a user input) or that have expired since the last clean-up operation. Clean-up timer 208, for example, may be set to generate an output signal every hour (or other desired time period). Based on the signal from clean-up timer 208, clean-up system 206 will be triggered to run (e.g., every hour or every other time increment that is output by clean-up timer 208). Expired lease identifier 210 identifies all of the leases (e.g., in lease data 148 in lease data store 118) that have expired. VM test instance ID collection system 212 collects the VM identifiers for each VM instance that corresponds to an expired lease. Each of those VM instance identifiers are placed in de-provisioning queue 214. Therefore, clean-up system 206 intermittently traverses all of the lease data to identify leases that have expired and also identifies the VM test instances corresponding to the expired leases and places those instance identifiers in the de-provisioning queue 214.

Instance deletion system 218 deletes the VM test instances that are identified based upon a user input (e.g., and detected by deletion trigger detector 204) as well as all of the VM test instances identified in the de-provisioning queue 214. The VM test instances are deleted from virtual machine scale set 110. Instance deletion system 218 can also delete any data that the VM test instance used. Credential deletion system 220 deletes the credentials corresponding to the de-provisioned or deleted VM test instances from credential storage system (key vault) 116. Scaling output generator 222 generates an output to VM scaling system 134 indicating the number of VM test instances that have been deleted or de-provisioned. VM scaling system 134 can then generate an output to VM provisioning system 136 to create or provision additional VM test instances, as needed. In one example, VM scaling system 134 maintains a first predetermined or dynamically configurable threshold number of hot VM test instances 152 and a second predetermined or dynamically configurable threshold number of warm VM test instances 154 so that users can obtain access to the VM test instances quickly.

Figure 3:
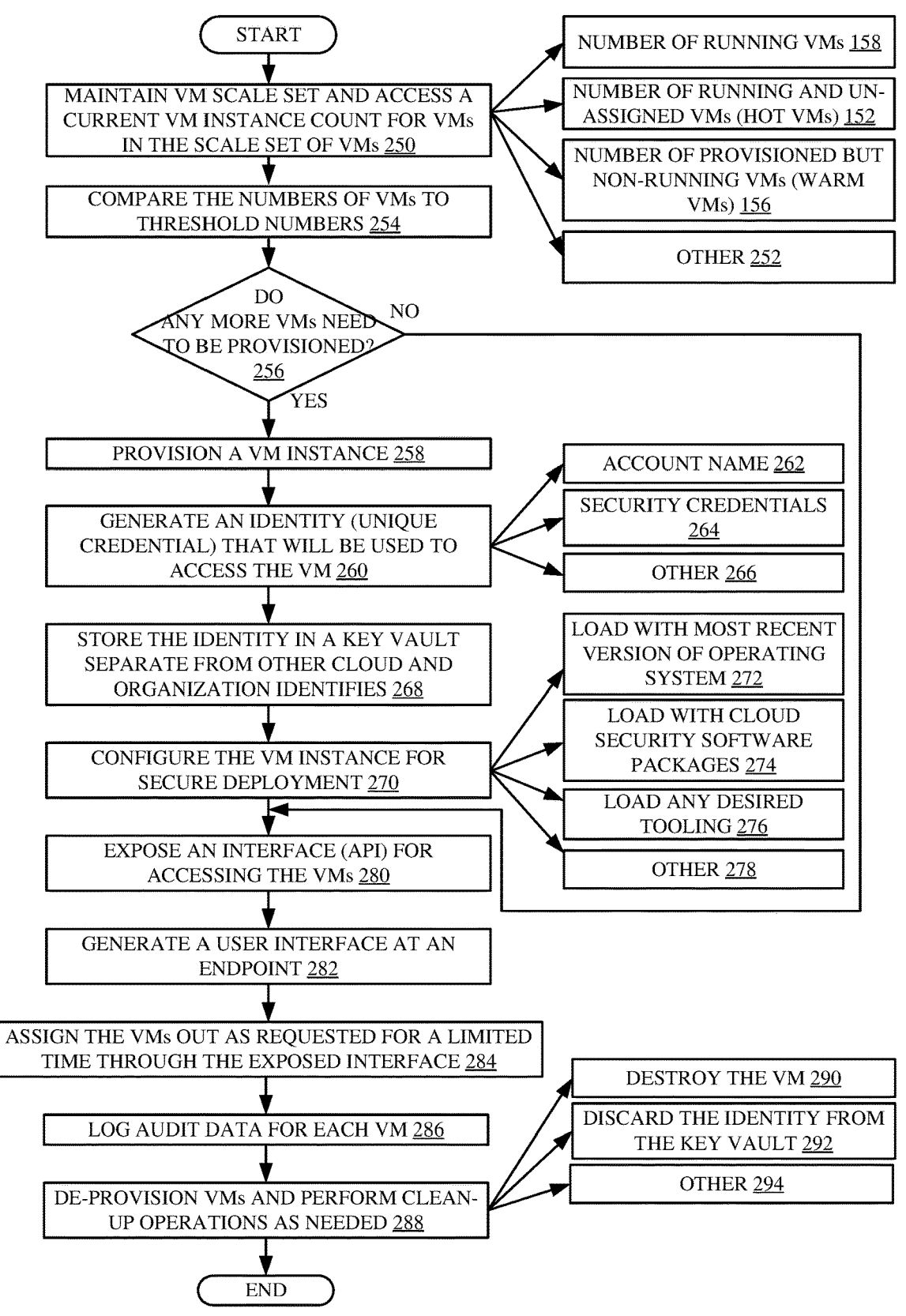
FIG. 3 is a flow diagram showing one example of the overall operation of the computing system architecture in managing virtual machine test instances (test machines).

FIG. 3 is a flow diagram illustrating one example of the operation of computing system architecture 100 in more detail. FIGS. 1-3 will now be described in conjunction with one another. It is first assumed that VM count processor 166 accesses a current VM instance count for all of the VM test instances in a scale set of VMs 110. Accessing a current VM instance count is indicated by block 250 in the flow diagram of FIG. 3. The count can be broken out into the number of VM test instances that are running and assigned to users, as indicated by block 158, the number of VM test instances that are running and not assigned to users as indicated by block 254 (e.g., the number of hot VM test instances 152), the number of provisioned but non-running VM test instances (e.g., warm VM test instances) 156, and the number of VM test instances in other states 252. The numbers of VM test instances can be compared to threshold numbers in order to determine whether any additional VM test instances should be provisioned, as indicated by block 254.

For instance, assume that the system is configured to maintain two hot VM test instances 152 and four warm VM test instances 154. It may also be that the total number of VM test instances has a threshold as well. If the number of hot VM test instances 152 is below a first desired threshold number, then additional hot VM test instances will be provisioned. If the number of warm VM test instances is below a second desired threshold number, then additional warm VM test instances will be provisioned. If the overall number of VM test instances is below a desired number, then additional VM test instances can be provisioned as well. If any more VM test instances need to be provisioned, based on the comparison of the count of VM test instances to the desired threshold number(s), as indicated by block 256, then VM scaling system 134 generates an output to VM provisioning system 136 to provision additional VM test instances, as indicated by block 258. VM provisioning system 136 creates a basic VM instance that can be configured by VM instance configuration system 174 as a VM test instance.

Credential generation processor 170 interacts with credential processing system 112 to generate a unique credential (or identity) that will be used to access the newly provisioned VM test instance as indicated by block 260. The unique credential can include an account name 262, a set of security credentials 264 (such as a username and password), an IP address, among other credentials 266. Key vault interaction system 172 then stores the unique identity in key vault 116 which is separate from storage systems that store other cloud and organization identities for the cloud environment being developed. Storing the identity in a separate key vault is indicated by block 268 in the flow diagram of FIG. 3.

VM instance configuration system 174 then configures the VM test instance for secure deployment. Configuration is indicated by block 270 in the flow diagram of FIG. 3. For example, OS loading system 176 loads the VM test instance with the most recent version of a desired operation system, as indicated by block 272. Security software loading system 178 loads the VM test instance with cloud or remote server security software packages to enhance security against surreptitious access, as indicated by block 274. Tool unloading system 180 loads the VM test instance with desired tooling that can be used by the engineer to perform testing operations, as indicated by block 276. The VM test instance can be configured in other ways, with other items, as well, as indicated by block 278.

Backend system 104 exposes API 107 to allow tenant systems to access the configured VMs test instances, as indicated by block 280. The client VM accessing system 126 generates a user interface 108 at an end point or tenant computing system 102 for interaction by user 106. Generating a user interface is indicated by block 282. User 106 then interacts with the interface to request access to a VM test instance, and VM leasing system 138 processes that request and assigns the provisioned VM test instances out to various requesting users, as requested, for a limited time, as indicated by block 284. Once assigned a VMs test instance, user 106 is sent the credentials can use the credentials to access the VM test instance and audit system 120 logs audit data for each VM test instance, as indicated by block 286. At some point, one or more of the VM test instances will need to be de-provisioned (such as when user 106 requests that the VM test instance be released or deleted, or during a clean-up operation. De-provisioning VM test instances and performing clean-up operations, as needed, is indicated by block 288 in the flow diagram of FIG. 3.

Instance deletion system 218 tears down or destroys the VM test instances as indicated by block 290, and can delete any data used by the VM test instance, as indicated by block 291. Credential deletion system 220 discards the identity (unique credentials) for the de-provisioned VM test instances from the credential storage system or key vault 116. Discarding the credentials is indicated by block 292 in the flow diagram of FIG. 3. De-provisioning system 140 can de-provision VM test instances in other ways as well, as indicated by block 294.

FIG. 4 is a flow diagram showing one example of the operation of tenant (frontend) computing system 102 in more detail. VM accessing system 126 uses user interface system 128 to display a user interface (UI) 108 which allows user 106 to request access to (or lease) a VM test instance from virtual machine scale set 110. Displaying the UI is indicated by block 296 in the flow diagram of FIG. 4. VM accessing system 126 then detects user interaction with the user interface, as indicated by block 298. In one example, the user interface surfaces a user input mechanism that allows user 106 to request a lease (e.g., request an assignment of a VM test instance) as indicated by block 300. In another example, the user interface includes a user input mechanism that allows the user to request a lease extension when an initial expiration period is about to expire. Requesting an extension is indicated by block 302. The user interface 108 also illustratively exposes a user input mechanism that allows user 106 to remove or delete a lease when the user 106 is finished using the assigned VM test instance. Requesting removal or deletion of a lease or VM test instance is indicated by block 304. The user interface 108 also illustratively includes a user input mechanism that allows the user to see information for all leases that user 106 currently has, as indicated by block 306. The user interface can include a wide variety of other user input mechanisms allowing user 106 to interact with the user interface in other ways as well, as indicated by block 308.

VM accessing system 126 then identifies user 106 and performs operations based on the detected user interactions, as indicated by block 310 in the flow diagram of FIG. 4. For instance, when VM accessing system 126 detects user 107 requesting a lease (or requesting assignment of a VM test instance) system 126 interacts with VM leasing system 138 through API 107 to return to user 106 the IP address, other credentials, and term (or expiration time) for the assigned VM test instance. Returning the IP address, other credentials, term of lease, etc. is indicated by block 312 in the flow diagram of FIG. 4. VM accessing system 126 then provides user 106 with access and authentication to the assigned VM test instance, as indicated by block 314.

Where VM accessing system 126 allows user 106 to extend a lease, system 126 may generate a warning display indicating that the lease is about to expire (e.g., one hour ahead of expiration, 30 minutes ahead of expiration, etc.). For example, term processing system 192 can scan lease data 148 to identify expiration times for the different leases and send a signal to the frontend system 102 corresponding to leases that are about to expire so the warning message can be generated. Displaying a warning message is indicated by block 316 in the flow diagram of FIG. 4. The warning message may include an actuator that user 106 can actuate to request that the expiration of the lease be extended (where the ultimate expiration deadline has not yet been reached) and VM accessing system 126 then detects that user 106 has interacted with that user input mechanism to request a time extension, as indicated by block 318. The extension request can be provided to extension processor 196 in VM leasing system 138 to reset the expiration time for the corresponding lease (and VM test instance) to an extended expiration time as indicated by block 320.

When VM accessing system 126 detects that user 106 has provided an input to remove or delete a lease (or VM test instance) after user 106 is finished with the VM test instance, then VM accessing system 126 interacts with de-provisioning system 140 indicating that user 106 has requested that a lease (and/or corresponding VM test instance) be removed or deleted. In that case, de-provisioning system 140 de-provisions the VM test instance, removes the corresponding credentials and any data that was used. Performing such a deletion operation is indicated by block 322 in the flow diagram of FIG. 4.

When VM accessing system 126 detects a user interaction in which user 106 is requesting to view information for all current leases or other leases of user 106, then VM leasing system 138 uses data store interaction system 142 to retrieve all of the lease data 148 for user 106, indicative of the lease information for all of the user's leases. Accessing the lease information for this user is indicated by block 324. The lease information is returned to VM accessing system 126. VM accessing system 126 uses user interface system 128 to generate a user interface display surfacing all of the lease information for user 106, as indicated by block 326. The lease information for each VM test instance may include such things as the type of VM instance, the credentials (e.g., username, password, IP address, etc.), expiration time, number of hours to expiration, any time extensions that may be available, among a wide variety of other data.

When VM accessing system 126 detects another user input from user 106, then VM accessing system 126 interacts with backend system 104 through API 107 to perform other processing, as indicated by block 328 in the flow diagram of FIG. 4.

Figure 5:
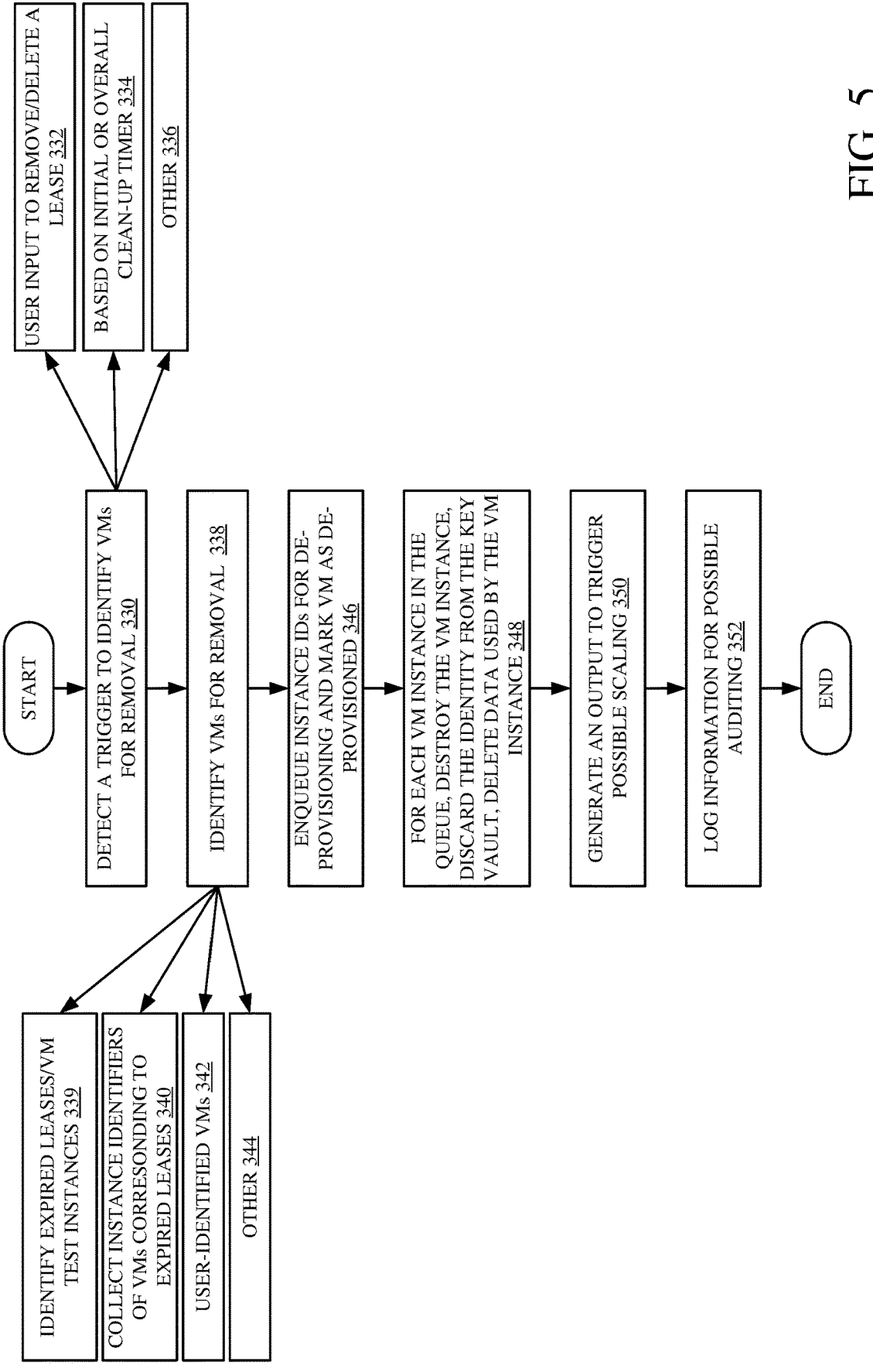
FIG. 5 is a flow diagram showing one example of the operation of a backend system in more detail.

FIG. 5 is a flow diagram illustrating one example of operation of de-provisioning system 140 in de-provisioning (e.g., and tearing down or destroying) one or more VM test instances. De-provisioning system 140 first detects a trigger indicating that a VM test instance is to be removed or de-provisioned, as indicated by block 330 in the flow diagram of FIG. 5. In one example, deletion trigger detector 204 detects that user 106 has provided an input indicating that a particular VM test instance (or corresponding lease) should be deleted as indicated by block 332. In another example, expiration processor scans the expiration data or lease data 148 (continuously or intermittently) to identify leases that have expired, and marks those leases as expired, as indicated by block 339 in FIG. 5. Expired lease identifier 210 detects that a lease has been marked as expired, or that clean-up timer 208 has provided an output indicating that it is time for a clean-up operation to be performed, as indicated by block 334 in the flow diagram of FIG. 5. De-provisioning system 140 can detect other triggers indicating that one or more VM test instances are to be deleted as well, as indicated by block 336 in the flow diagram of FIG. 5.

De-provisioning system 140 then identifies the VM test instances for removal (e.g., for deletion or de-provisioning) as indicated by block 338. For instance, expired lease identifier 210 may identify all of the leases that have been marked as expired since the last clean-up operation, and VM instance ID collection system 212 identifies the VM test instances corresponding to those leases and enters the VM instance identifiers in de-provisioning queue 214. Collecting the VM instance identifiers corresponding to expired leases is indicated by block 340 in the flow diagram of FIG. 5. In another example, deletion trigger detector 204 may provide a VM instance identifier that has been identified by user 106 in the user's request to delete or remove the corresponding lease or VM test instance. Obtaining a user-identified VM instance identifier is indicated by block 342 in the flow diagram of FIG. 5. The VM test instances can be identified for removal or de-provisioning in other ways as well, as indicated by block 344. The VM test instances that have been identified for removal or de-provisioning are enqueued in de-provisioning queue 214 and the status of those VM test instances in virtual machine scale set 110 is marked as de-provisioned. Enqueuing the VM instance identifiers and marking the VM instances as de-provisioned is indicated by block 346 in the flow diagram of FIG. 5.

For each VM instance identified in the de-provisioning queue 214, instance deletion system 218 destroys the VM test instance and credential deletion system 220 discards the corresponding identity (or credentials) from the key vault 116, and system 218 or 220 deletes any data that was used by the VM instance. Destroying the VM test instance, discarding the identity, and deleting the data are indicated by block 348 in the flow diagram of FIG. 5.

Scaling output generator 222 can then generate an output to VM scaling system 134 to trigger possible scaling (e.g., provisioning additional VM test instances) as indicated by block 350 in the flow diagram of FIG. 5. Audit interaction system 144 generates an output to audit system 120 to log all operations and/or activity corresponding to the VM test instances, including deletion or de-provisioning of the VM test instance, the time the VM test instance was deleted/de-provisioned, as well as all of the events and actions performed during the lifetime of the VM test instance. Logging information in the auditing system 120 is indicated by block 352 in the flow diagram of FIG. 5.

It can thus be seen that the present description describes a system which generates and deploys VM test instances in a secure way. The VM test instances, when they are provisioned, have a unique credential generated for them and that credential is stored in a key vault (or other secret store) that is separate from the store where other cloud or organization credentials are stored. In addition, when a user requests access to a VM test instance, the credentials are provided to the user for a limited time period (which may be extendable). These steps limit the access of a surreptitious or malicious actor by limiting the movement of that actor within the cloud environment and also by limiting the time during which the actor may use the credentials. The VM test instances, before they are assigned to a user, are also loaded with a current version of a desired operating system (thus ensuring that all security patches have been applied), cloud or other network security packages (to enhance the security and detectability against surreptitious activity), as well as the tools needed for testing (so that the tools need not be loaded at a later time which would also increase the risk of surreptitious or malicious activity). Also, a scale set of virtual machine test instances is maintained, in one example, with some being hot virtual machine test instances, and some being warm virtual machine instances. The virtual machine test instances which are no longer in use are regularly discarded, as are the corresponding credentials and data. This reduces the likelihood that a malicious actor may gain access to those virtual machine test instances. The present system thus enhances the security of the test infrastructure.

It will be noted that the above discussion has described a variety of different systems, components, and/or logic. It will be appreciated that such systems, components, and/or logic can be comprised of hardware items (such as processors and associated memory, or other processing components, some of which are described below) that perform the functions associated with those systems, components, and/or logic. In addition, the systems, components, and/or logic can be comprised of software that is loaded into a memory and is subsequently executed by a processor or server, or other computing component, as described below. The systems, components, and/or logic can also be comprised of different combinations of hardware, software, firmware, etc., some examples of which are described below. These are only some examples of different structures that can be used to form the systems, components, and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of, the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
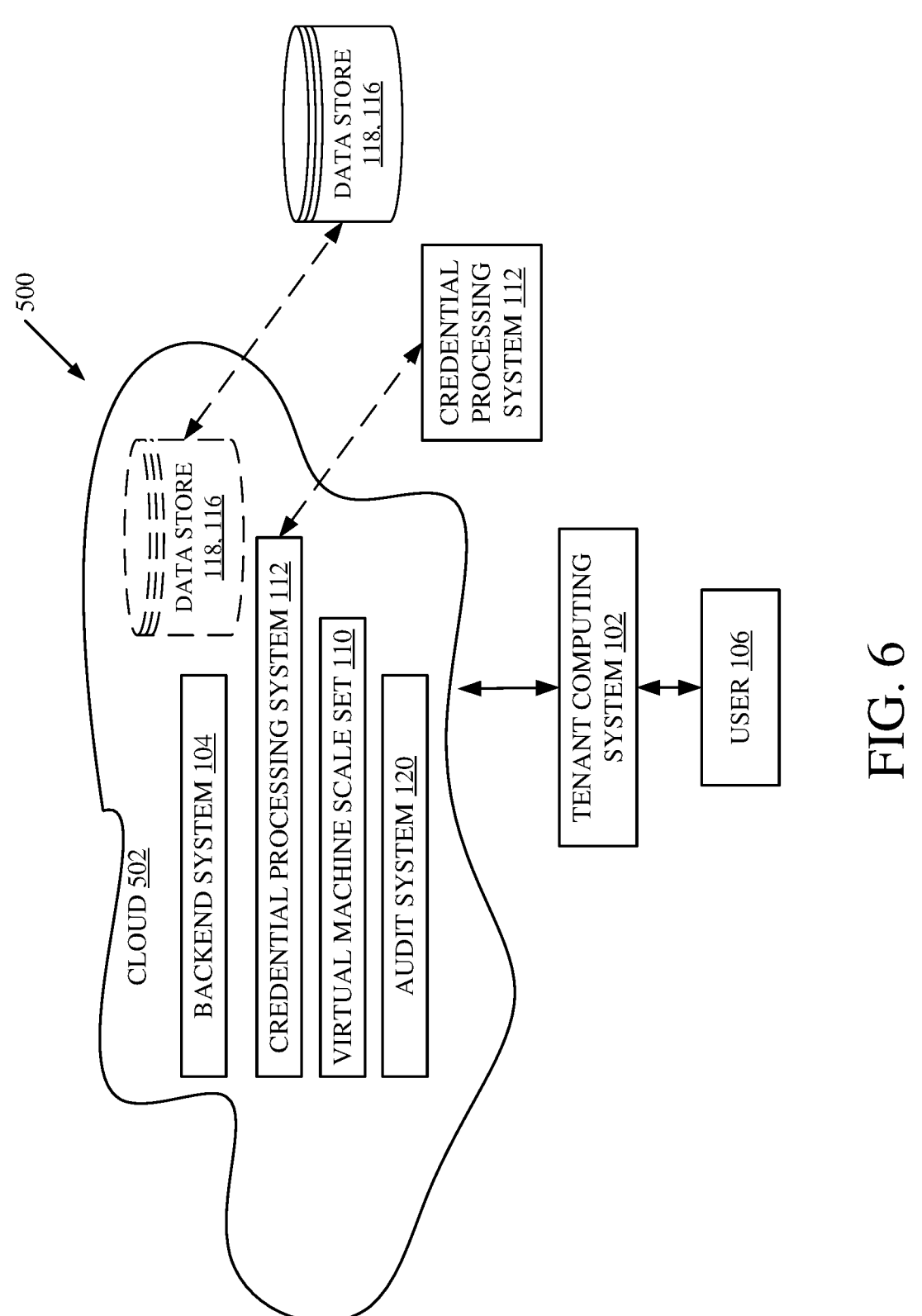
FIG. 6 is a block diagram showing one example of the computing system architecture more specifically deployed in a remote server architecture (e.g., a cloud computing environment).

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that backend system 132, credential processing system 112, lease data store 118, VMs 110, key vault 116, and audit system 120 can be located in cloud 502 (which can be public, private, or a combination where portions are public while others are private). Therefore, user 106 uses tenant computing system 102 to access those systems through cloud 502.

FIG. 6 also depicts another example of a cloud architecture. FIG. 6 shows that it is also contemplated that some elements of computing system architecture 100 can be disposed in cloud 502 while others are not. By way of example, data stores 116, 118, and credential processing system 112, (and/or other items) can be disposed outside of cloud 502, and accessed through cloud 502. Regardless of where the items are located, the items can be accessed directly by system 102, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
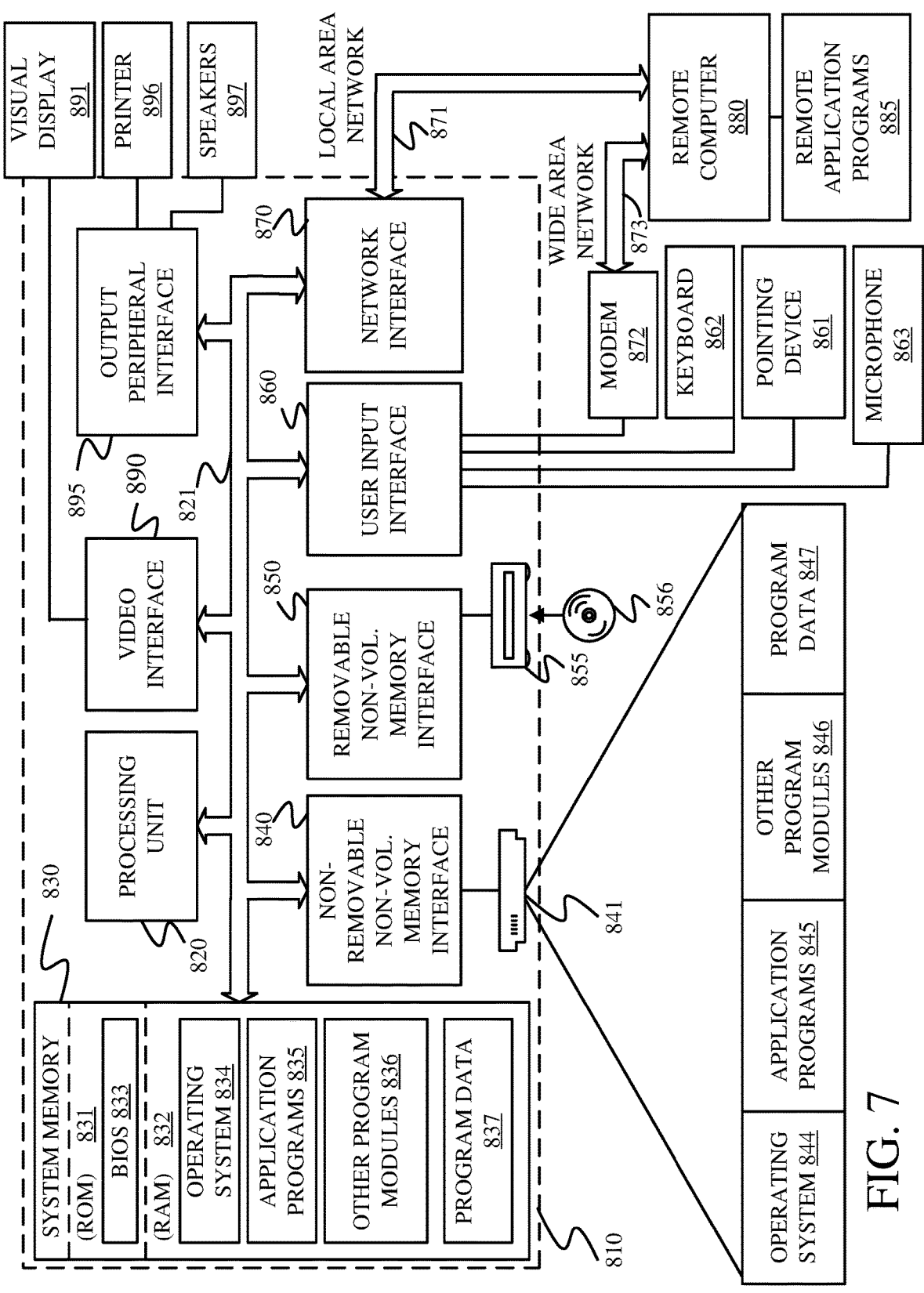
FIG. 7 is a block diagram showing one example of a computing environment that can be used in the architectures and systems shown in previous figures.

FIG. 7 is one example of a computing environment in which architecture 100, or parts of it, (for example) can be deployed. With reference to FIG. 7, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are examples and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
generating a virtual machine (VM) test instance in a remote server environment;
generating a unique credential corresponding to the VM test instance, the unique credential being generated in connection with the VM test instance to access the VM test instance;
communicating the unique credential to a secret store to store the unique credential in the secret store separate from the VM test instance;
receiving, from a tenant system, a request for access to the VM test instance;
returning the unique credential to the tenant system based on the request;
detecting expiration of a time limit corresponding to the requested access to the VM test instance; and
based on expiration of the time limit, destroying the VM test instance in the remote server environment and destroying the unique credential from the secret store.

2. The computer-implemented method of claim 1 and further comprising:
based on expiration of the time limit, deleting data used by the VM test instance.

3. The computer-implemented method of claim 1 wherein the remote server environment includes a user credential store that stores credentials for remote server users and wherein communicating the unique credential to the secret store comprises:
communicating the unique credential to the secret store, the secret store being separate from the user credential store.

4. The computer-implemented method of claim 1 wherein returning the unique credential to the tenant system comprises:
obtaining a user identity identifying a requesting user;
identifying the time limit corresponding to the requested access to the VM test instance;
generating lease data indicative of an assignment of the VM test instance to the requesting user, the lease data including the user identity, a VM test instance identifier identifying the VM test instance assigned to the requesting user, and expiration data indicative of the time limit; and
storing the lease data in a lease data store.

5. The computer-implemented method of claim 4 wherein generating a VM test instance comprises:
detecting a VM count indicative of a number of VM test instances that are provisioned in a VM scale set and unassigned to a user;
determining that an additional VM test instance is to be generated based on the VM count; and
generating the additional VM test instance.

6. The computer-implemented method of claim 5 wherein detecting a VM count comprises detecting a hot VM test instance count indicative of a number of hot VM test instances that are configured and running in the VM scale set and unassigned to a user and wherein determining that an additional VM test instance is to be generated comprises comparing the hot VM test instance count to a first threshold to determine that an additional hot VM test instance is to be generated and wherein generating the additional VM test instance comprises generating the additional hot VM test instance.

7. The computer-implemented method of claim 5 wherein detecting a VM count comprises detecting a warm VM test instance count indicative of a number of warm VM test instances that are configured, non-running VM test instances in the VM scale set and unassigned to a user and wherein determining that an additional VM test instance is to be generated comprises comparing the warm VM test instance count to a second threshold to determine that an additional warm VM test instance is to be generated and wherein generating the additional VM test instance comprises generating the additional warm VM test instance.

8. The computer-implemented method of claim 1 wherein generating the VM test instance comprises:
prior to returning the unique credential to the tenant system, configuring the VM test instance for secure deployment.

9. The computer-implemented method of claim 8 wherein configuring the VM test instance for secure deployment comprises:
loading the VM test instance with a current version of an operating system.

10. The computer-implemented method of claim 8 wherein configuring the VM test instance for secure deployment comprises:
loading the VM test instance with a security software package that inhibits surreptitious activity with respect to the VM test instance.

11. The computer-implemented method of claim 8 wherein configuring the VM test instance for secure deployment comprises:
loading the VM test instance with a testing tool used to test functionality of the remote server environment.

12. The computer-implemented method of claim 1 wherein detecting expiration of a time limit comprises:

intermittently detecting a VM identifier corresponding to each of a plurality of VM test instances that have expired time limits; and enqueueing the detected VM identifiers in an expired VM instance queue, wherein destroying the VM test instance comprises destroying each VM test instance identified in the expired VM instance queue.

13. A computing system, comprising:

a virtual machine (VM) provisioning system configured to generate a virtual machine (VM) test instance in a remote server environment;

a credential generation processor configured to generate a unique credential corresponding to the VM test instance, the unique credential being generated in connection with the VM test instance to access the VM test instance;

a secret store interaction system configured to communicate the unique credential to a secret store that stores the unique credential separate from the VM test instance;

a VM leasing system configured to receive, from a tenant system, a request for access to the VM test instance and return the unique credential to the tenant system based on the request;

an expiration processor configured to detect expiration of a time limit corresponding to the requested access to the VM test instance; and a de-provisioning system configured to destroy the VM test instance in the remote server environment and destroy the unique credential from the secret store based on expiration of the time limit.

14. The computing system of claim 13 wherein the remote server environment includes a user credential store that stores credentials for remote server users and wherein the secret store is separate from the user credential store.

15. The computing system of claim 13 wherein the expiration processor is configured to identify the time limit corresponding to the requested access to the VM test instance and wherein the VM leasing system comprises:

a user identifier configured to obtain a user identity identifying a requesting user;

a VM assignment system configured to generate lease data indicative of an assignment of the VM test instance to the requesting user, the lease data including the user identity, a VM test instance identifier identifying the VM test instance assigned to the requesting user, and expiration data indicative of the time limit; and a data store interaction system configured to store the lease data in a lease data store.

16. The computing system of claim 15 and further comprising:

a VM scaling system configured to detect a VM count indicative of a number of VM test instances that are provisioned in a VM scale set and unassigned to a user and to determine that an additional VM test instance is to be generated based on the VM count, the VM provisioning system being configured to generate the additional VM test instance based on the determination that an additional VM test instance is to be generated.

17. The computing system of claim 16 wherein the de-provisioning system comprises:

a clean-up system configured to intermittently detect a VM identifier corresponding to each of a plurality of VM test instances that have expired time limits and store the detected VM identifiers in an expired VM instance queue;

an instance deletion system configured to destroy in the VM scale set each of the VM test instances identified in the expired VM instance queue; and a credential deletion system configured to remove each unique credential, corresponding to a VM test instance identified in the expired VM instance queue, from the secret store.

18. The computing system of claim 13 wherein the VM provisioning system comprises:

an operating system (OS) loading system configured to load the VM test instance with a current version of an operating system prior to the VM leasing system returning the unique credential to the tenant system based on the request;

a security software loading system configured to load the VM test instance with a security software package that inhibits surreptitious activity with respect to the VM test instance prior to the VM leasing system returning the unique credential to the tenant system based on the request; and a tool loading system configured to load the VM test instance with a testing tool used to test functionality of the remote server environment prior to the VM leasing system returning the unique credential to the tenant system based on the request.

19. A computing system comprising:

at least one processor; and a data store storing computer executable instructions which, when executed by the at least one processor, cause the at least one processor to perform steps comprising:

maintaining, in a virtual machine (VM) scale set in a remote server environment, a threshold number of provisioned and configured VM test instances, each of the VM test instances having a corresponding unique credential generated in connection with the corresponding VM test instance to access the corresponding VM test instance;

communicating the corresponding unique credential for each of the VM test instances to a secret store that encrypts and stores the corresponding unique credentials separate from the VM test instances;

receiving, from a tenant system, a request for access to a VM test instance of the VM test instances;

returning the corresponding unique credential in the secret store for the VM test instance to the tenant system based on the request;

setting an expiration time limit corresponding to the corresponding unique credential returned to the tenant system;

detecting expiration of the expiration time limit; and based on expiration of the expiration time limit, destroying the VM test instance in the remote server environment and destroying the corresponding unique credential from the secret store.

20. The computing system of claim 19 wherein detecting expiration of the expiration time limit comprises:

intermittently detecting a VM identifier corresponding to each of a plurality of VM test instances in the VM scale set that have expired expiration time limits; and enqueueing the detected VM identifiers in an expired VM instance queue, wherein destroying the VM test instance comprises destroying each VM test instance identified in the expired VM instance queue.

* * * * *